United States Patent
Nordlin

(10) Patent No.: US 7,150,589 B2
(45) Date of Patent: Dec. 19, 2006

(54) DEBURRING TOOL

(75) Inventor: William F. Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 68 days.

(21) Appl. No.: 10/954,882

(22) Filed: Sep. 30, 2004

(65) Prior Publication Data
US 2005/0089383 A1   Apr. 28, 2005

Related U.S. Application Data

(60) Provisional application No. 60/507,661, filed on Oct. 1, 2003.

(51) Int. Cl.
*B23C 3/12* (2006.01)
*B23C 5/00* (2006.01)

(52) U.S. Cl. ............... 409/138; 409/140; 409/234; 409/217; 407/31; 144/237

(58) Field of Classification Search ........ 409/138–140, 409/232, 234, 180, 192, 203, 213, 217; 407/31, 407/55, 61; 144/237; 408/224
See application file for complete search history.

(56) References Cited

U.S. PATENT DOCUMENTS

| | | | |
|---|---|---|---|
| 390,982 A * | 10/1888 | Mower | 407/31 |
| 487,233 A * | 11/1892 | Taft | 407/31 |
| 1,630,173 A * | 5/1927 | Dumont | 144/237 |
| 1,882,692 A | 10/1932 | Albertson | |
| 3,165,813 A | 1/1965 | Harvell et al. | |
| 3,191,500 A * | 6/1965 | Shuster | 409/138 |
| 3,292,493 A * | 12/1966 | Franklin | 409/138 |
| 3,733,663 A * | 5/1973 | Brucker | 407/31 |
| 3,946,777 A * | 3/1976 | Heimbrand | 144/237 |
| 4,009,637 A * | 3/1977 | Bittner | 407/31 |
| 4,032,251 A | 6/1977 | Ribich | |
| 4,068,558 A * | 1/1978 | Loos | 409/8 |
| 4,100,949 A * | 7/1978 | Carter | 144/402 |
| 5,154,553 A * | 10/1992 | Baumstark | 409/8 |
| 5,173,013 A * | 12/1992 | Gorse et al. | 408/22 |
| 5,468,100 A | 11/1995 | Naim | |
| 5,607,263 A * | 3/1997 | Nespeta et al. | 408/227 |
| 5,697,833 A * | 12/1997 | Hislop | 409/138 |
| 5,711,642 A | 1/1998 | Ball et al. | |
| 5,727,913 A * | 3/1998 | Naim | 409/138 |
| 6,012,881 A | 1/2000 | Scheer | |
| 6,050,758 A * | 4/2000 | Cavaliere et al. | 409/137 |
| 6,109,841 A | 8/2000 | Johne | |
| 6,134,786 A | 10/2000 | Graupner et al. | |
| 6,354,347 B1 * | 3/2002 | Brewer | 407/31 |
| 6,511,265 B1 | 1/2003 | Mirchandani et al. | |
| 6,551,035 B1 | 4/2003 | Bruhn et al. | |
| 2001/0000223 A1 | 4/2001 | Anjanappa et al. | |

(Continued)

FOREIGN PATENT DOCUMENTS

DE    3432936 A1 *  3/1986

(Continued)

*Primary Examiner*—Erica Cadugan
(74) *Attorney, Agent, or Firm*—Trexler, Bushnell, Giangiorgi, Blackstone & Marr, Ltd

(57) ABSTRACT

A deburring tool includes a proximal cutter and a distal cutter which form a V-shaped groove within which a workpiece is positioned to remove burrs from both sides of the workpiece simultaneously. The cutting edges of the proximal and distal cutters do not include any under cuts and therefore can be formed using a powdered metal process.

17 Claims, 5 Drawing Sheets

U.S. PATENT DOCUMENTS

| | | |
|---|---|---|
| 2002/0054799 A1 | 5/2002 | Anjanappa et al. |
| 2002/0110432 A1 | 8/2002 | Puide et al. |
| 2003/0118413 A1 | 6/2003 | Bruhn et al. |
| 2003/0118415 A1 | 6/2003 | Feld |
| 2003/0175086 A1 | 9/2003 | Muhlfriedel et al. |

FOREIGN PATENT DOCUMENTS

| | | | |
|---|---|---|---|
| GB | 2153726 A | * | 8/1985 |
| JP | 62236613 A2 | | 10/1987 |
| JP | 11300515 A2 | | 11/1999 |

* cited by examiner

DEBURRING TOOL

RELATED APPLICATION

This application claims the benefit of U.S. provisional patent application Ser. No. 60/507,661, filed on Oct. 1, 2003 and entitled Deburring Cutter.

BACKGROUND OF THE INVENTION

The invention relates to a tool for deburring a workpiece.

Holes can be made in a workpiece, for example, sheet metal using a punch, hole saw, or a high speed cutter. As a result of forming such holes, sharp edges and/or burrs are left on the workpiece around the circumference of the hole. These sharp edges can be hazardous. For example, when assembling switches, push buttons, or conduit connectors, the sharp edges can cut an assembler's hands. In addition, the burrs can be problematic when assembling accessories to the workpiece. The burrs prevent the accessory from laying flat against the surface of the workpiece and therefore cause an undesirable appearance. In addition, when the accessory does not lay flat against the surface, an oil tight and dust proof fit is not provided.

Typically, when electrical panels are made, it is customary for all panel openings to be hand filed. Removing the burrs from the work piece by using a hand file is a slow and costly process and is ergonomically undesirable.

Although deburring tools are available which may reduce the time necessary to remove burrs from a workpiece, such tools are relatively expensive to manufacture and therefore are not readily available.

The present invention provides a deburring tool which overcomes the problems presented in the prior art and which provides additional advantages over the prior art, such advantages will become clear upon a reading of the attached specification in combination with a study of the drawings.

OBJECTS AND SUMMARY OF THE INVENTION

An object of the present invention is to provide a deburring tool which quickly removes burrs from the surface of a workpiece.

Another object of the present invention is to provide a deburring tool which simultaneously deburs both sides of the workpiece.

Yet another object of the present invention is to provide a deburring tool which allows the burrs or chips removed from the workpiece to be easily ejected from the tool.

Still another object of the present invention is to provide a deburring tool which is cost efficient to manufacture.

The present invention provides a deburring tool including a proximal cutter and a distal cutter. The cutters simultaneously remove burrs from two sides of a workpiece. The proximal and distal cutters of the deburring tool are formed using a powder metal process.

DETAILED DESCRIPTION OF THE ILLUSTRATED EMBODIMENT

Figure 1:
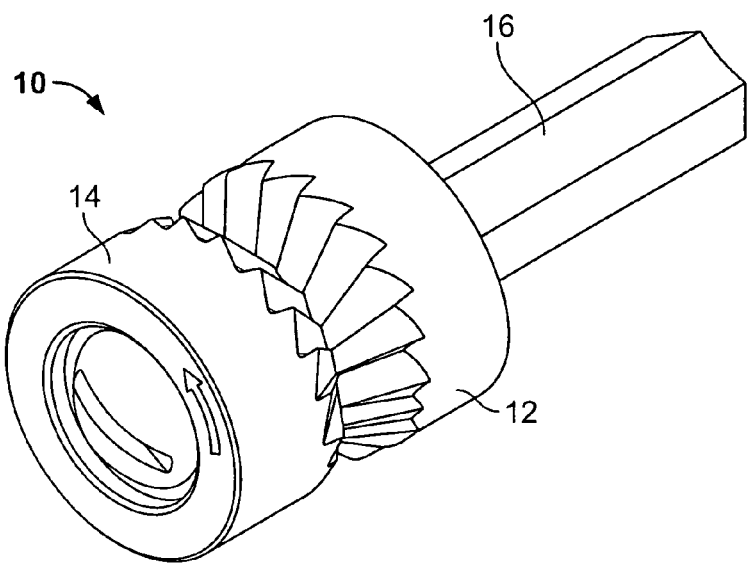
FIG. 1 is a perspective view of the deburring tool.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The deburring tool 10 of the present invention is shown in FIGS. 1–4. As will be described herein, the deburring tool 10 is mounted within the chuck of an electric drill (not shown) to provide rotation of the deburring tool 10. In this description, the word "proximal" is used to describe elements, surfaces and portions of the tool 10 closest to the electric drill and the word "distal" is used to describe elements, surfaces and portions of the tool 10 furthest from the electric drill.

As shown in FIGS. 1–4, the deburring tool 10 includes a proximal cutter 12 and a distal cutter 14 mounted onto a shaft 16. The proximal and distal cutters 12,14 are secured to the shaft 16 using a bolt 18 and a snap ring 88.

Figure 5:
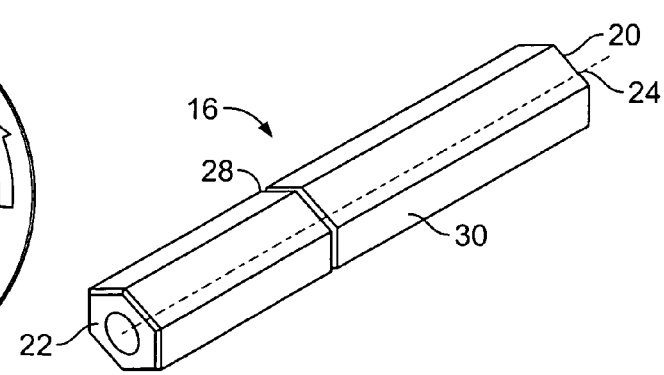
FIG. 5 is a perspective view of the shaft of the deburring tool of FIG. 1.
Figures 6, 7:
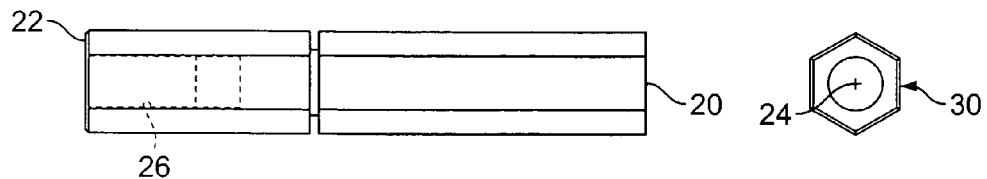
FIG. 6 is a side elevational view of the shaft of FIG. 5.
FIG. 7 is a distal end view of the shaft of FIG. 5.
Figure 8:
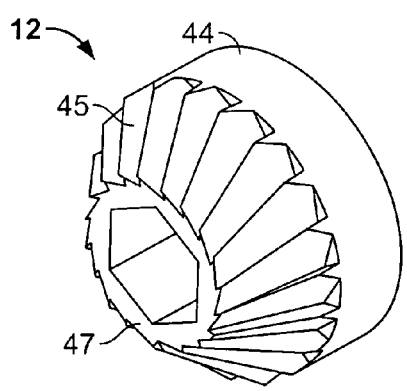
FIG. 8 is a perspective view of the proximal cutter of the deburring tool of FIG. 1.
Figure 9:
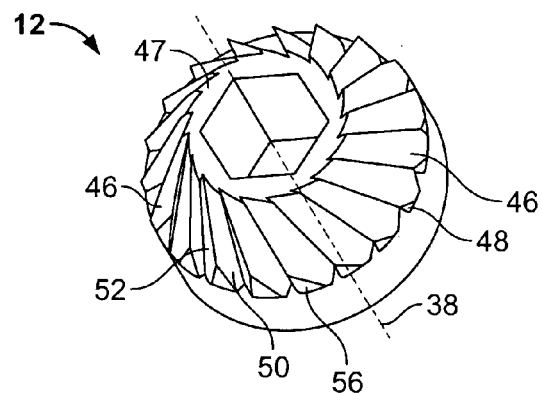
FIG. 9 is a perspective view of the proximal cutter of FIG. 8.

The shaft 16 of the deburring tool 10 is shown in FIGS. 5–7. The shaft 16 is generally elongated and has a hexagonally-shaped cross-section. The shaft 16 includes a proximal end 20 and a distal end 22. In use, the proximal end 20 of the shaft 16 is mounted within the chuck of the electric drill to provide rotation to the deburring tool 10. An axis of rotation 24 is defined by the shaft 16. The axis 24 is provided at the axial center of the shaft 16 and extends from the proximal end 20 to the distal end 22 of the shaft 16. A cylindrically-shaped bolt passageway 26 extends inwardly from the distal end 22 of the shaft 16 along the axis of rotation 26. A thread is provided along the surface of the bolt passageway 26 for engagement of the bolt 18. A groove 28, which is spaced from the proximal and distal ends 20, 22 of the shaft 16, is provided in an outer surface 30 of the shaft 16. The groove 28 is positioned proximally of the bolt passageway 26. The groove 28 provides a cylindrically shaped surface on which the snap ring 88 is supported.

The proximal cutter 12 is best shown in FIGS. 8–12. The proximal cutter 12 includes a proximal end 34 and a distal end 36. The diameter of the proximal cutter 12 at its proximal end 34 is larger than the diameter of the proximal cutter 12 at its distal end 36. An axis 38 is defined by the proximal cutter 12. The axis 38 is provided at the axial center of the proximal cutter 12 and extends from the proximal end 34 to the distal end 36.

The proximal cutter 12 also includes a base portion 44 and a cutting portion 45 integrally formed with the base portion 44. The base portion 44 is provided proximate the proximal end 34 of the proximal cutter 12 and the cutting portion 45 is provided proximate the distal end 36 of the proximal cutter 12. The distance from the proximal end 34 to the distal end 36 of the proximal cutter 12 is preferably 0.469 inches. A hexagonally-shaped shaft passageway 40 is provided around the axial center of the proximal cutter 12 and extends through the base portion 44 and the cutting portion 45.

The shaft passageway 40 extends from the proximal end 34 to the distal end 36 of the proximal cutter 12. The shaft passageway 40 is slightly larger than outer dimensions of the shaft 16, such that the shaft 16 can pass through the shaft passageway 40 as will be described herein. Preferably, diametrically opposed sides of the shaft passageway 40 are approximately 0.318 inches apart.

The base portion 44 of the proximal cutter 12 is generally cylindrically-shaped and includes a proximal end 44a and a distal end 44b. Preferably the distance between the proximal end 44a and the distal end 44b is 0.210 inches. The diameter of the base portion 44 of the proximal cutter 12 is preferably 0.813 inches. A cylindrically-shaped recess 42 is provided within the base portion 44 and extends from the proximal end 34 of the proximal cutter 12. Preferably, the recess 42 extends 0.063 inches from the proximal end 34 of the proximal cutter 12. The recess 42 is concentric with the shaft passageway 40.

The cutting portion 45 of the proximal cutter 12 includes an abutting surface 47 and a plurality of flutes 46.

The abutting surface 47 is provided at the distal end 36 of the proximal cutter 12. The abutting surface 47 extends diametrically outwardly from the shaft passageway 40 to the flutes 46. The abutting surface 47 is generally perpendicular to the axis 38 of the proximal cutter 12.

Figure 13:
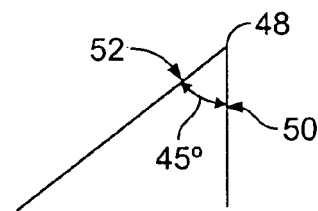
FIG. 13 is a detailed view of a portion of a flute of the proximal cutter of FIG. 8.
Figure 14:
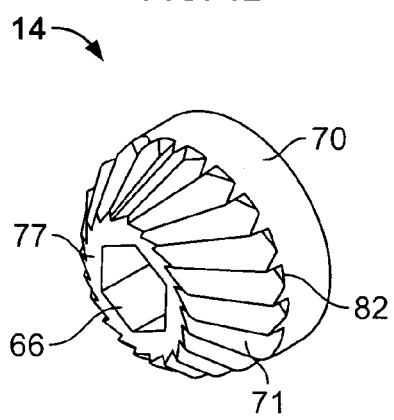
FIG. 14 is a perspective view of the distal cutter of the deburring tool of FIG. 1.
Figure 15:
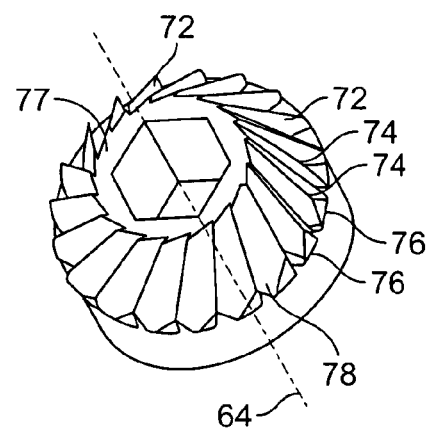
FIG. 15 is a perspective view of the distal cutter of FIG. 14.

The flutes 46 extend between the abutting surface 47 and the distal end 44b of the base 44 of the proximal cutter 12. The flutes 46 are equally spaced around the cutting portion 45 and are provided in a spiral or helical arrangement. As shown, twenty flutes 46 are provided. Each flute 46 includes a cutting edge 48, a rake surface 50, a relief surface 52, and an end surface 56. Each rake surface 50 intersects a relief surface 52 to form a cutting edge 48. The rake surface 50 has an inner end proximate to the shaft 16, an outer end proximate to the shaft 16, a lower end and an upper end. The relief surface 52 has an inner end proximate to the shaft 16, an outer end distal to the shaft 16, a lower end and an upper end. As such, cutting edge 48 extends between the upper ends of the rake and relief surfaces 50, 52. The lower ends of the rake and relief surfaces 50, 52 of adjacent flutes 46 merge together. As will be described herein, the proximal cutter 12 rotates in the direction shown by the arrow 54 when mounted on the shaft 16. Relative to the direction of rotation, the rake surface 50 leads the cutting edge 48 and the relief surface 52 follows the cutting edge 48. The relationship between the rake surface 50, the relief surface 52 and the cutting edge 48 is depicted in FIG. 13. Each relief surface 52 is angled relative to the rake surface 50. Preferably, the angle between the rake surface 50 and the relief surface 52 is forty-five degrees. Each rake surface 50 is parallel to the axis 38 of the proximal cutter 12. Each relief surface 52 controls the depth of the cut to be made by the proximal cutter 12. The end surface 56 of each flute 46 extends from the rake surface 50 to the relief surface 52 and from the cutting edge 48 to the base portion 44 such that each end surface 56 is generally triangularly-shaped. The end surface 56 of each flute 46 extends between the outer ends of the rake and relief surfaces 50, 52. As clearly shown in the drawings, the end surfaces 56 are not parallel to the axis 38, and extend at an oblique angle thereto.

Figure 10:
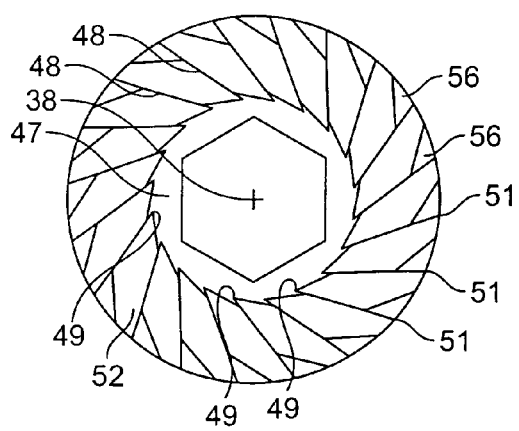
FIG. 10 is a distal end view of the proximal cutter of FIG. 8.
Figure 11:
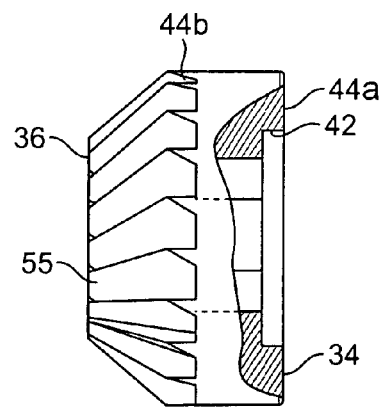
FIG. 11 is a side elevational view of the proximal cutter of FIG. 8.
Figure 12:
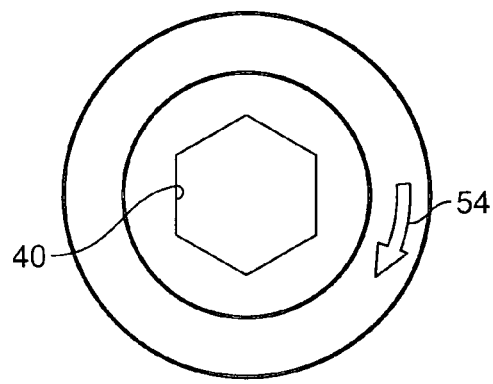
FIG. 12 is a proximal end view of the proximal cutter of FIG. 8.

As best shown in FIG. 10, the cutting edges 48 are linear. Each cutting edge 48 includes an inner end 49 and an outer end 51. The inner end 49 of each cutting edge 48 is spaced radially outwardly from the axis 38. The cutting edges 48 do not however, extend in the radial direction. Rather, the cutting edges 48 are arranged in a spiral manner such that the outer end 51 of each cutting edge is offset from a point radially outward of the inner end 49. Each cutting edge 48 is angled relative to an adjacent cutting edge 48. Preferably the angle between each cutting edge 48 and an adjacent cutting edge 48 is 18 degrees. The cutting edges 48 are also angled relative to the abutting surface 47, preferably forty-five degrees.

The distal cutter 14 is best shown in FIGS. 14–18. The distal cutter 14 is a mirror image of the proximal cutter 12. The distal cutter 14 includes a proximal end 60 and a distal end 62. The diameter of the distal cutter 14 at its proximal end 60 is smaller than the diameter of the distal cutter 14 at its distal end 62. An axis 64 is defined by the distal cutter 14. The axis 64 is provided at the axial center of the distal cutter 14 and extends from the proximal end 20 to the distal end 62.

The distal cutter 14 also includes a base portion 70 and a cutting portion 71 integrally formed with the base portion 70. The base portion is provided proximate the distal end 62 of the distal cutter 14 and the cutting portion 71 is provided proximate the proximal end 60 of the distal cutter 14. The distance from the proximal end 60 to the distal end 62 of the distal cutter 14 is preferably 0.469 inches.

A hexagonally-shaped shaft passageway 66 is provided around the axial center of the distal cutter 14 and extends through the base portion 70 and the cutting portion 71. The shaft passageway 66 extends from the proximal end 60 to the distal end 62 of the distal cutter 14. The shaft passageway 66 is slightly larger than outer dimensions of the shaft 16, such that the shaft 16 can pass through the shaft passageway 66 as will be described herein. Preferably, diametrically opposed sides of the shaft passageway 66 are approximately 0.318 inches apart.

The base portion 70 of the distal cutter 14 is generally cylindrically-shaped and includes a proximal end 70a and a distal end 70b. Preferably, the distance between the proximal end 70a and the distal end 70b is 0.210 inches. The diameter of the base portion 70 is preferably 0.813 inches. A cylindrically-shaped recess 68 is provided within the base portion 70 and extends from the distal end 62 of the distal cutter 14. Preferably, the recess 68 extends 0.063 inches from the distal end 62 of the distal cutter 14. The recess 68 is concentric with the shaft passageway 66.

The cutting portion 71 of the distal cutter 14 includes an abutting surface 77 and a plurality of flutes 72.

The abutting surface 77 is provided at the proximal end 60 of the distal cutter 14. The abutting surface 77 extends diametrically outwardly from the shaft passageway 66 to the flutes 72. The abutting surface 77 is generally perpendicular to the axis 64 of the distal cutter 14.

The flutes 72 extend between the abutting surface 77 and the proximal end 70a of the base 70 of the distal cutter 14. The flutes 72 are equally spaced around the cutting portion 71 and are provided in a spiral or helical arrangement. As shown, twenty flutes 72 are provided. Each flute 72 includes a cutting edge 74, a rake surface 76 and a relief surface 78, and an end surface 75. Each rake surface 76 intersects a relief surface 78 to form a cutting edge 74. The rake surface 76 has an inner end proximate to the shaft 16, an outer end distal to the shaft 16, a lower end and an upper end. The relief surface 78 has an inner end proximate to the shaft 16, an outer end distal to the shaft 16, a lower end and an upper end. As such, cutting edge 74 extends between the upper ends of the rake and relief surfaces 76, 78. The lower ends of the rake and relief surfaces 76, 78 of adjacent flutes 72 merge together. As will be described herein, the distal cutter 14 rotates in the direction shown by the arrow 80 when mounted to the shaft 16. Relative to the direction of rotation, the rake surface 76 leads the cutting edge 74 and the relief surface 78 follows the cutting edge 74. The rake surface 76 is parallel to the axis 64 of the distal cutter 14. The relief surface 78 controls the depth of the cut to be made by the distal cutter 14. The relief surface 78 is angled relative to the rake surface 76. Preferably, the angle between the rake surface 76 and the relief surface 78 is forty-five degrees. Each rake surface 76 is parallel to the axis 64 of the distal cutter 14. The end surface 75 of each flute 72 extends from the rake surface 76 to the relief surface 78 and from the cutting edge 74 to the base portion 70 such that each end surface 75 is generally triangulary-shaped. The end surface 75 of each flute 72 extends between the outer ends of the rake and relief surfaces 76, 78. As clearly shown in the drawings, the end surfaces 75 are not parallel to the axis 64, and extend at an oblique angle relative thereto.

Figure 16:
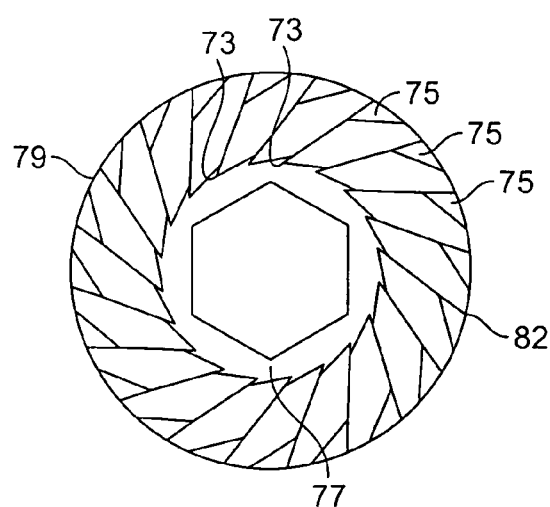
FIG. 16 is a proximal end view of the distal cutter of FIG. 14.
Figure 17:
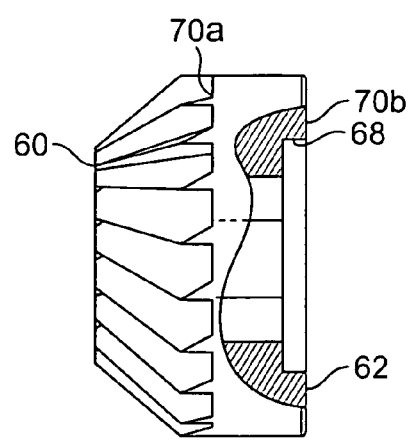
FIG. 17 is a side elevational view of the distal cutter of FIG. 14 with a portion of the distal cutter shown in cross-section.
Figure 18:
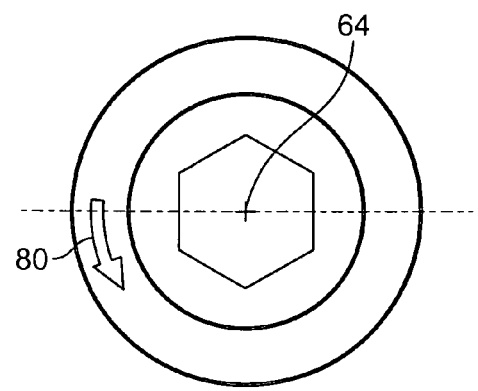
FIG. 18 is a proximal end view of the distal cutter of FIG. 14.

As best shown in FIG. 16, the cutting edges are linear. Each cutting edge 74 includes an inner end 73 and an outer end 79. The inner end 73 of each cutting edge 74 is spaced radially outwardly from the axis 38. The cutting edges 74 do not, however, extend in the radial direction. Rather, the cutting edges 74 are arranged is a spiral manner such that the outer end 79 of each cutting edge 74 is offset from a point radially outward of the inner end 73. Each cutting edge 74 is angled relative to an adjacent cutting edge 74. Preferably the angle between each cutting edge 74 and an adjacent cutting edge 74 is eighteen degrees. The cutting edges 74 are also angled relative to the abutting surface 77, preferably forty-five degrees.

To assemble the deburring tool 10, a snap ring 88 (shown in phantom in FIG. 3) is placed around the shaft 16 and in the groove 28. The snap ring 88 extends radially outwardly beyond the surface of the shaft 16. The proximal cutter 12 is then mounted to the shaft 16 by passing the proximal end 34 of the proximal cutter 12 over the shaft 16, sliding the proximal cutter 12 along the shaft 16 until it is fully mounted on the shaft 16 such that the snap ring 88 is seated with the recess 42 of the proximal cutter 12.

The distal cutter 14 is then mounted to the shaft 16 by passing the proximal end 60 of the distal cutter 14 over the shaft 16, sliding the distal cutter 14 along the shaft 16 until it is fully mounted on the shaft 16 such that the abutting surface 77 of the distal cutter 14 abuts the abutting surface 47 of the proximal cutter 12.

Figure 2:
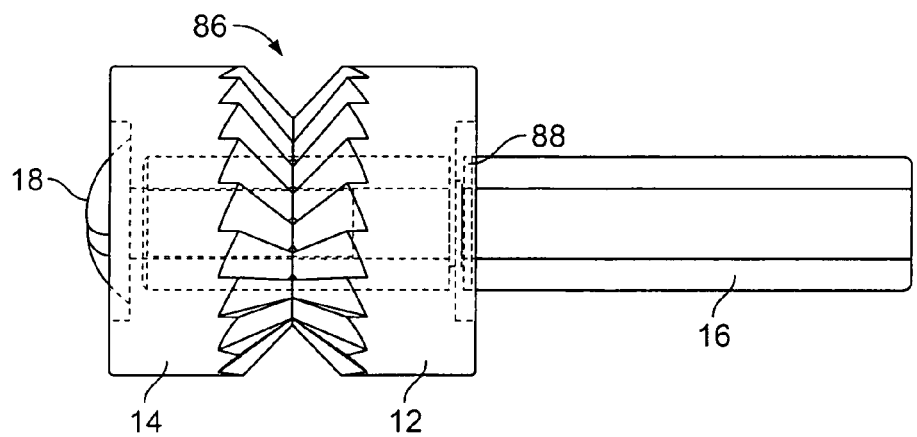
FIG. 2 is a side elevational view of the deburring tool of FIG. 1.
Figure 3:
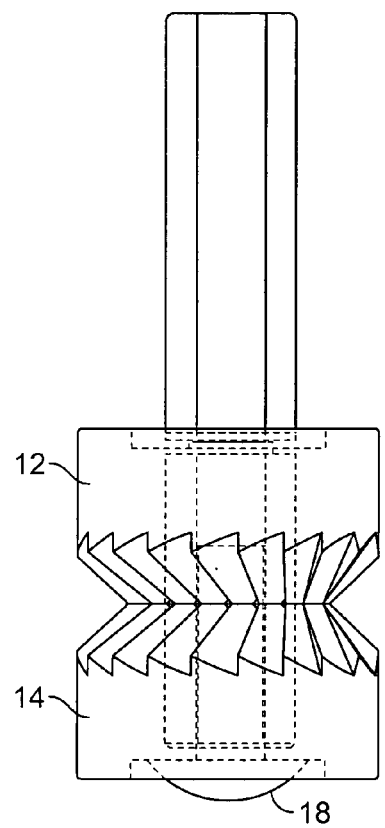
FIG. 3 is a top plan view of the deburring tool of FIG. 1.
Figure 4:
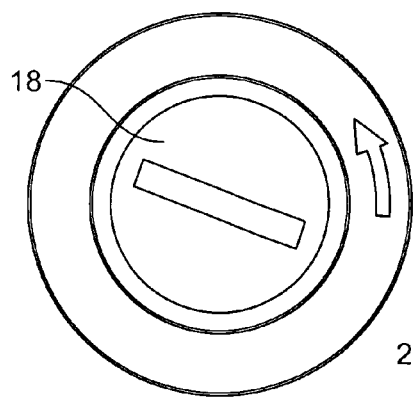
FIG. 4 is a distal end view of the deburring tool of FIG. 1.

The bolt 18 is then placed within the bolt passageway 26 of the shaft 16 and engaged with the threads within the bolt passageway 26. The bolt 18 is advanced until the head of the bolt 18 is partially positioned within the recess 68 of the distal cutter 14. The proximal and distal cutters 12, 14 are prevented from moving proximally along the shaft 16 by the snap ring 88 mounted within the groove 28. The proximal and distal cutters 12, 14 are prevented from moving distally along the shaft 16 by the bolt 18 engaged at the distal end 22 of the shaft 16. As best illustrated in FIGS. 2 and 3, the assembled deburring tool 10 forms a V-shaped groove 86 between the proximal and distal cutters 12, 14. Preferably, the groove 86 is ninety degrees (forty-five degrees from a plane parallel to the distal end 36 or abutting surface 47 of the proximal cutter 12 to the cutting edges 48 of the proximal cutter 12 and forty-five degrees from a plane parallel to the proximal end 60 or abutting surface 77 of the distal cutter 14 to the cutting edges 74 of the distal cutter 14).

When a hole is formed in a workpiece such as, for example, a piece of sheet metal, often times a punch, hole saw or high speed cutter leaves sharp edges or burrs. These sharp edges or burrs can be hazardous and can also cause assembly problems. For example, when a push button is to be mounted in the hole, the burrs may prevent the push button from laying flat against the sheet metal. To use the deburring tool 10, the user begins by placing the proximal end 20 of the shaft 16 within the chuck of an electric drill (not shown). The user then passes the distal cutter 14 through the hole of the work piece to be deburred such that the distal side of the workpiece is proximate the distal cutter 14 and the proximal side of the workpiece is proximate the proximal cutter 12. The deburring tool 10 is then centered with respect to the workpiece such that the workpiece is centered within the V-shaped groove 86 formed by the proximal and distal cutters 12, 14. Rotation is then provided to deburring tool 10 through the electric drill. As the deburring tool 10 rotates, the distal cutter 14 engages the distal side of the workpiece and the proximal cutter 12 engages the proximal side of the workpiece to remove burrs from both sides of the workpiece simultaneously. The deburring tool 10 is moved orbitally relative to the workpiece until the sharp edges and/or burrs are removed around the entire circumference of the hole. Alternatively, the deburring tool 10 can be moved along the edge of a workpiece to remove burrs from the edge of a workpiece.

By providing only twenty flutes 46 on the proximal cutter 12 and twenty flutes 72 on the distal cutter 14, the depth of each flute 46, 72 is sufficient to allow the chips of sheet metal removed from the workpiece to exit the tool 10.

As the deburring tool 10 is moved around the circumference of the hole, the V-shaped groove 86 guides the deburring tool 10 on the edge of the workpiece and prevents the deburring tool 10 from damaging the surface of the workpiece. The V-shaped groove 86 can accommodate 10 gauge to 20 gauge sheet metal. By providing twenty flutes on each of the proximal and distal cutters 12, 14, the deburring tool 10 can be easily controlled. Thus, the flutes 46, 72 are coarse enough to allow for chip clearance and fine enough to operate smoothly against the workpiece. The deburring tool 10 can be used to debur holes have a diameter of ⅞ inches or larger. Applicants estimate that use of the deburring tool 10 reduces the filing time by approximately 90 percent when compared to the amount of time needed to file the workpiece by hand.

Figure 19:
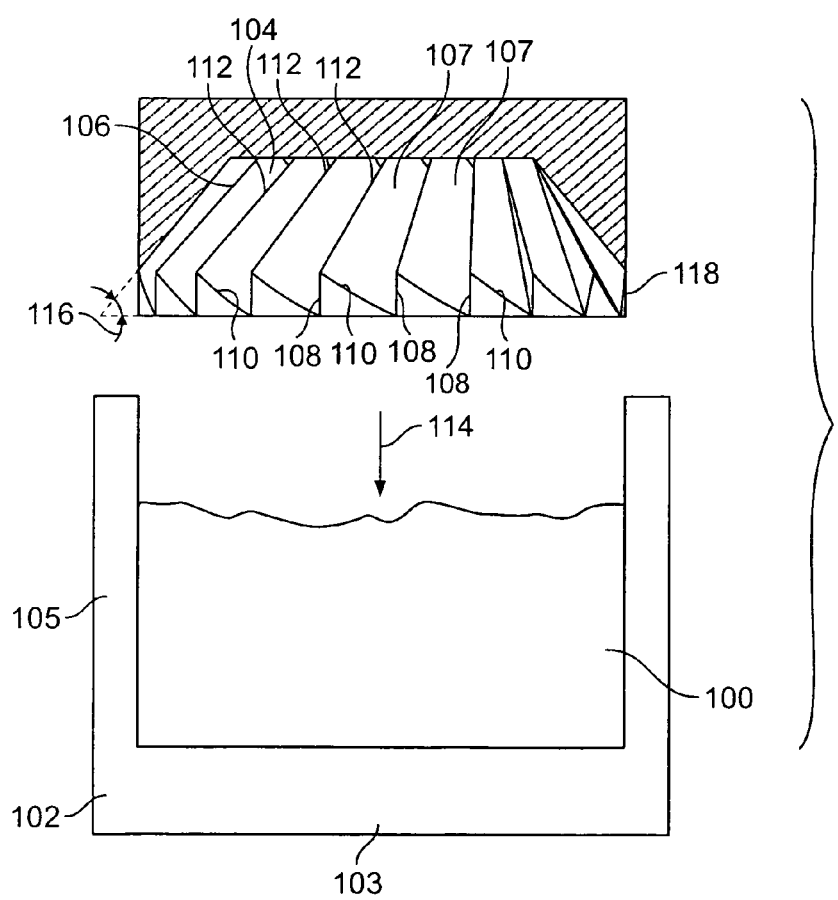
FIG. 19 is a cross-sectional view of the cavity and punch used to form the proximal cutter of FIG. 8.

The proximal and distal cutters 12, 14 are formed using a powder metal process. Formation of the proximal cutter 12 is shown in FIG. 19 with the understanding that the distal cutter 14 is formed in the same manner. Powdered metal 100 is placed within a generally cylindrically-shaped cavity 102.

The cavity 102 includes a base 103 and side walls 105 perpendicular to the base. The inner surfaces of the base 103 and the side walls 105 define the base portion 44 of the proximal cutter 12. Thus, the inner diameter of the cavity 102 is equivalent to the diameter of the base portion 44 of the proximal cutter 12.

A punch 104 is provided to compress the powered metal 100 within the cavity 102 to form the proximal cutter 12. To compress the powdered metal 100 the punch 104 is lowered into the cavity 102 in the direction of the arrow 114. The arrow 114 is parallel to the axis of the piece to be formed by the punch 104 and the cavity 112. The punch 104 includes interior walls 106 which define recesses 107 for forming the flutes 46 of the cutting portion 45 of the proximal cutter 12. The recesses 107 are "negatives" of the flutes 46, i.e. each recess has been configured to form the desired shape of the flutes 46. Each recess 107 includes a rake wall 108, a relief wall 110 and a cutting groove 112. The rake wall 108 and the relief wall 110 of each recess 107 intersects to provide the cutting groove 112. The rake walls 108 are angled relative to the relief walls 110, preferably at an angle of forty-five degrees. In the same manner as the flutes 46, the recesses 107 are provided in a spiral or helical arrangement. Each rake wall 108 of the punch 104 is parallel to the arrow 114. As a result of the rake walls 108 being parallel to the axis of the proximal cutter 12 to be formed by the punch 104, no "under cut" is provided by the rake walls 108 relative to the relief walls 110. When manufacturing the punch 104, the rake walls 108 and the relief walls 110 provide tips 116 which extend beyond the outer diameter of the base portion 44 of the proximal cutter 12 to be formed by the punch 104. These sharp tips 116 deform under the force of the manufacturing process. Therefore, to strengthen the punch 104, the tips 116 are ground down such that the rake walls 108 and the relief walls 110 do not extend beyond the inner surface of the side walls 105 of the cavity 102. Grinding off the tips 116 provides for formation of the end surfaces 56 of the proximal cutter 12.

After filling the cavity 102 with powdered metal, the powered metal is heated and the punch 104 is lowered onto the powdered metal 100 and the punch 104 compresses the powdered metal within the cavity 102 to form the proximal cutter 12.

The punch 104 is then lifted from the cavity 102. Because the rake walls 108 are parallel to the direction in which the punch 104 is lowered, the proximal and distal cutters 12, 14 do not include any "undercuts". Therefore, the punch 104 can be removed from the cavity 102 using a "straight pull" and the cutting edges 48 of the proximal cutter 12 are not damaged when the punch 104 is pulled from the cavity 102.

Finally, if desired, once the cutter 12 is removed from the cavity 102, the cutter 12 can be heat treated.

By forming the proximal and distal cutters 12, 14 using the pressed powdered metal process, the proximal and distal cutters 12, 14 can be made much less expensively than by using a machining process. Certain disadvantages are encountered as a result of forming the proximal and distal cutters 12, 14 using the pressed metal process. For example, because the surfaces 50, 76 do not undercut the cutting edges 48, 74, the sharpness of the cutting edges 48, 74 is limited. In addition, the smallest radius possible using the pressed metal process is typically 0.005 to 0.010 inches, therefore the sharpness of the cutting edges, is limited to approximately 0.005 to 0.010 inches. Although, parts made using the pressed powdered metal process can be heat treated to hardness readings of Rc 60 and above, the pressed metal process limits the strength and durability of the cutting edges 48, 74 because the density of a pressed powdered metal part is significantly less than the density of a part machined from cold rolled bar stock. The cost savings provided by the pressed powdered metal process, however, outweighs the disadvantages of the process.

While preferred dimensions for various aspects of the deburring tool 10 are described, it is to be understood that other dimensions can be used without departing from the scope of the invention.

While a preferred embodiment of the present invention is shown and described, it is to be understood that those skilled in the art may devise various modifications of the present invention without departing from the spirit and scope of the attached claims.

The invention claimed is:

1. A tool for deburring a workpiece comprising:
   a shaft having a proximal end and a distal end and defining an axis of rotation;
   a proximal cutter attached to said shaft, said proximal cutter having a proximal end, a distal end and a plurality of flutes, a diameter of said proximal cutter being larger at said proximal end than a diameter of said proximal cutter at said distal end, each said flute including a rake surface having a radially inner end proximate to said shaft, a radially outer end distal to said shaft, a lower end and an upper end, a relief surface having a radially inner end proximate to said shaft, a radially outer end distal to said shaft, a lower end and an upper end, a cutting edge joining said upper ends of said rake and relief surfaces, and an end surface extending between the outer ends of said rake and relief surfaces, the rake surface of each said flute is parallel to the axis of rotation, said end surface being at an oblique angle to the axis of rotation, and the lower ends of the rake and relief surfaces of adjacent flutes merging together;
   a distal cutter attached to said shaft, said distal cutter having a proximal end, a distal end and a plurality of flutes, a diameter of said distal cutter being larger at said distal end than a diameter said distal cutter at said proximal end, each said flute including a rake surface having a radially inner end proximate to said shaft, a radially outer end distal to said shaft, a lower end and an upper end, a relief surface having a radially inner end proximate to said shaft, a radially outer end distal to said shaft, a lower end and an upper end, a relief surface having a radially inner end proximate to said shaft, a radially outer end distal to said shaft, a lower end and an upper end, a cutting edge joining said upper ends of said rake and relief surfaces, and an end surface extending between the outer ends of said rake and relief surfaces, the rake surface of each said flute is parallel to the axis of rotation, said end surface being at an oblique angle to the axis of rotation, and the lower ends of the rake and relief surfaces of adjacent flutes merging together; and
   the distal end of said proximal cutter being positioned proximate the proximal end of said distal cutter, and a groove for recieving the workpiece is provided by said proximal and distal cutters.

2. A tool as defined in claim 1, wherein said flutes of said proximal cutter are arranged in a spiral configuration.

3. A tool as defined in claim 2, wherein each said relief surface of each said flute of said proximal cutter is angled relative to each said rake surface of each said flute of said proximal cutter at an angle of approximately forty-five degrees.

4. A tool as defined in claim 2, wherein said proximal cutter includes twenty flutes.

5. A tool as defined in claim 1, wherein said flutes of said distal cutter are arranged in a spiral configuration.

6. A tool as defined in claim 5, wherein each said relief surface of each said flute of said distal cutter is angled relative to each said rake surface of each said flute of said distal cutter at an angle of approximately forty-five degrees.

7. A tool as defined in claim 5, wherein said distal cutter includes twenty flutes.

8. A tool as defined in claim 1, wherein said flutes of said proximal cutter and said flutes of said distal cutter are arranged in a spiral configuration.

9. A tool as defined in claim 8, wherein each said relief surface of each said flute of said proximal cutter is angled relative to each said rake surface of each said flute of said proximal cutter at an angle of approximately forty-five degrees and each said relief surface of each said flute of said distal cutter is angled relative to each said rake surface of each said flute of said distal cutter at an angle of approximately forty-five degrees.

10. A tool as defined in claim 8, wherein said proximal cutter includes twenty flutes and said distal cutter includes twenty flutes.

11. A tool as defined in claim 1, wherein each said cutting edge of each said flute of said proximal cutter and each said cutting edge of each said flute of said distal cutter are linear.

12. A tool as defined in claim 1, further including a bolt engaged with said distal end of said shaft and with said distal cutter.

13. A tool as defined by claim 1, wherein said groove provided by said proximal and distal cutters provides an angle of approximately ninety degrees.

14. A tool as defined by claim 1, wherein the cutting edges of said flutes of said proximal cutter and the cutting edges of said flutes of said distal cutter are angled approximately 45 degrees relative to a plane perpendicular to the axis of rotation.

15. A tool as defined by claim 1, wherein said proximal cutter and said distal cutter each include a shaft passageway and wherein said proximal and said distal cutters are attached to said shalt by passing said shaft through said passageways of said proximal and said distal cutters.

16. A tool as defined by claim 1, wherein said distal cutter is a mirror image of said proximal cutter.

17. A tool for deburring a workpiece comprising:
 a shaft having a proximal end and a distal end and defining an axis of rotation;
 a proximal cutter attached to said shaft, said proximal cutter having a proximal end, a distal end and a plurality of flutes, a diameter of said proximal cutter being larger at said proximal end than a diameter of said proximal cutter at said distal end, each said flute including a rake surface, a relief surface and a cutting edge, and the rake surface of each said flute is parallel to the axis of rotation, a recess extending from said proximal end of said proximal cutter;
 a distal cutter attached to said shaft, said distal cutter having a proximal end, a distal end and a plurality of flutes, a diameter of said distal cutter being larger at said distal end than a diameter of said distal cutter at said proximal end, each said flute including a rake surface, a relief surface and a cutting edge, and the rake surface of each said flute is parallel to the axis of rotation;
 the distal end of said proximal cutter being positioned proximate the proximal end of said distal cutter, and a groove for receiving the workpiece is provided by said proximal and distal cutters; and
 a snap ring positioned within said recess of said proximal cutter.

* * * * *